(12) United States Patent
Li et al.

(10) Patent No.: US 12,114,060 B2
(45) Date of Patent: Oct. 8, 2024

(54) METHOD, APPARATUS, DEVICE AND STORAGE MEDIUM FOR CONTENT CAPTURING

(71) Applicant: Beijing Zitiao Network Technology Co., Ltd., Beijing (CN)

(72) Inventors: Jia Li, Beijing (CN); Zhenan Li, Beijing (CN); Qing Song, Beijing (CN); Wanli Che, Beijing (CN); Wei Jiang, Beijing (CN); Di Duan, Beijing (CN); Fanhua Feng, Beijing (CN)

(73) Assignee: Beijing Zitiao Network Technology Co., Ltd. (CN)

( * ) Notice: Subject to any disclaimer, the term of this patent is extended or adjusted under 35 U.S.C. 154(b) by 0 days.

(21) Appl. No.: 18/520,503

(22) Filed: Nov. 27, 2023

(65) Prior Publication Data

US 2024/0098362 A1  Mar. 21, 2024

Related U.S. Application Data

(63) Continuation of application No. PCT/CN2023/096344, filed on May 25, 2023.

(30) Foreign Application Priority Data

Jun. 2, 2022  (CN) .......................... 202210625909.0

(51) Int. Cl.
*H04N 23/62* (2023.01)
*H04N 23/63* (2023.01)
*H04N 23/667* (2023.01)

(52) U.S. Cl.
CPC ........... *H04N 23/631* (2023.01); *H04N 23/62* (2023.01); *H04N 23/667* (2023.01)

(58) Field of Classification Search
None
See application file for complete search history.

(56) References Cited

U.S. PATENT DOCUMENTS

2008/0276269 A1* 11/2008 Miller .............. H04N 21/23424
725/34
2017/0220216 A1* 8/2017 Thompson ............ G06F 3/0483
(Continued)

FOREIGN PATENT DOCUMENTS

CN  108900771 A  11/2018
CN  109451245 A  3/2019
(Continued)

OTHER PUBLICATIONS

International Search Report issued Sep. 4, 2023 for PCT Application No. PCT/CN2023/096344, English translation (11 pages).
(Continued)

*Primary Examiner* — Eileen M Adams

(57) ABSTRACT

Embodiments of the disclosure provide a method, apparatus, device, and storage medium for content capturing. The method includes, in response to a capturing start instruction, presenting a capturing start page which including at least a capturing control; in response to detecting a trigger instruction for the capturing control, switching from the capturing start page to a capturing page for video capturing, the capturing page including at least a stop control and a pause control, and the stop control being presented in a more prominent way than the pause control; and in response to detecting a trigger instruction for the stop control, switching from the capturing page to a video editing page, the video editing page being used to edit a captured video. In this way, it is possible for users to quickly perform video capturing and directly enter the editing page to complete editing of a work.

20 Claims, 10 Drawing Sheets

(56) References Cited

U.S. PATENT DOCUMENTS

2020/0059705 A1* 2/2020 Tsukaya ............. H04N 21/4728
2022/0206738 A1* 6/2022 Anvaripour .......... G11B 27/031
2022/0342514 A1* 10/2022 Chao .................... G06F 3/0482

FOREIGN PATENT DOCUMENTS

| | | |
|---|---|---|
| CN | 109922265 A | 6/2019 |
| CN | 110312077 A | 10/2019 |
| CN | 113411490 A | 9/2021 |
| CN | 113747049 A | 12/2021 |
| CN | 114390199 A | 4/2022 |
| CN | 115022545 A | 9/2022 |
| CN | 115480684 A | 12/2022 |
| JP | 2005122058 A | 5/2005 |

OTHER PUBLICATIONS

First Office Action issued Aug. 31, 2023 in CN Appl. No. 202210625909.0, English translation (34 pages).

* cited by examiner

METHOD, APPARATUS, DEVICE AND STORAGE MEDIUM FOR CONTENT CAPTURING

This application is a continuation of International Patent Application No. PCT/CN2023/096344, filed on May 25, 2023, which claims priority to Chinese Patent Application No. 202210625909.0 filed on Jun. 2, 2022, and entitled "METHOD, APPARATUS, DEVICE, AND STORAGE MEDIUM FOR CONTENT CAPTURING".

FIELD

Example embodiments of the present disclosure generally relate to the field of multimedia processing, and in particular, to a method, apparatus, device, and computer readable storage medium for content capturing.

BACKGROUND

Currently more and more applications have been designed to provide various services to users. For example, users may browse, comment on, and repost all kinds of content in content-sharing applications, comprising multimedia content such as videos, images, image collections, and sounds. In addition, users creating and posting photos or videos of multimedia content is allowed in content-sharing applications. For application providers, it is desirable that more and more users can participate in content creation and posting. In this way, not only more and richer multimedia content can be provided on platforms, but also user viscosity of applications can be increased.

SUMMARY

In a first aspect of the present disclosure, a method of content capturing is provided. The method comprises: in response to a capturing start instruction, presenting a capturing start page, the capturing start page comprising at least a capturing control; in response to detecting a trigger instruction for the capturing control, switching from the capturing start page to a capturing page for video capturing, the capturing page comprising at least a stop control and a pause control, and the stop control being presented in a more prominent way than the pause control; and in response to detecting a trigger instruction for the stop control, switching from the capturing page to a video editing page, the video editing page being used to edit a captured video.

In a second aspect of the present disclosure, an apparatus for content capturing is provided. The apparatus comprises: a starting page presenting module configured to, in response to a capturing start instruction, present a capturing start page, the capturing start page comprising at least a capturing control; a capturing page switching module configured to, in response to detecting a trigger instruction for the capturing control, switch from the capturing start page to a capturing page for video capturing, the capturing page comprising at least a stop control and a pause control, and the stop control being presented in a more prominent way than the pause control; and an editing page switching module configured to, in response to detecting a trigger instruction for the stop control, switch from the capturing page to a video editing page, the video editing page being used to edit a captured video.

In a third aspect of the present disclosure, an electronic device is provided. The electronic device comprises: at least one processing unit; and at least one memory coupled to the at least one processing unit and storing instructions to be executed by the at least one processing unit, the instructions, when executed by the at least one processing unit, causing the electronic device to perform a method in the first aspect.

In a fourth aspect of the present disclosure, a computer readable storage medium is provided, having a computer program stored thereon, the computer program, when executed by a processor, performing a method in the first aspect.

It would be understood that the content described in the Summary section of the present disclosure is neither intended to identify key or essential features of the embodiments of the present disclosure, nor is it intended to limit the scope of the present disclosure. Other features of the present disclosure will be readily envisaged through the following description.

BRIEF DESCRIPTION OF THE DRAWINGS

Through the detailed description with reference to the accompanying drawings, the above and other features, advantages, and aspects of each embodiment of the present disclosure will become more apparent. The same or similar reference numerals represent the same or similar elements throughout the figures, wherein.

DETAILED DESCRIPTION

Figure 1:
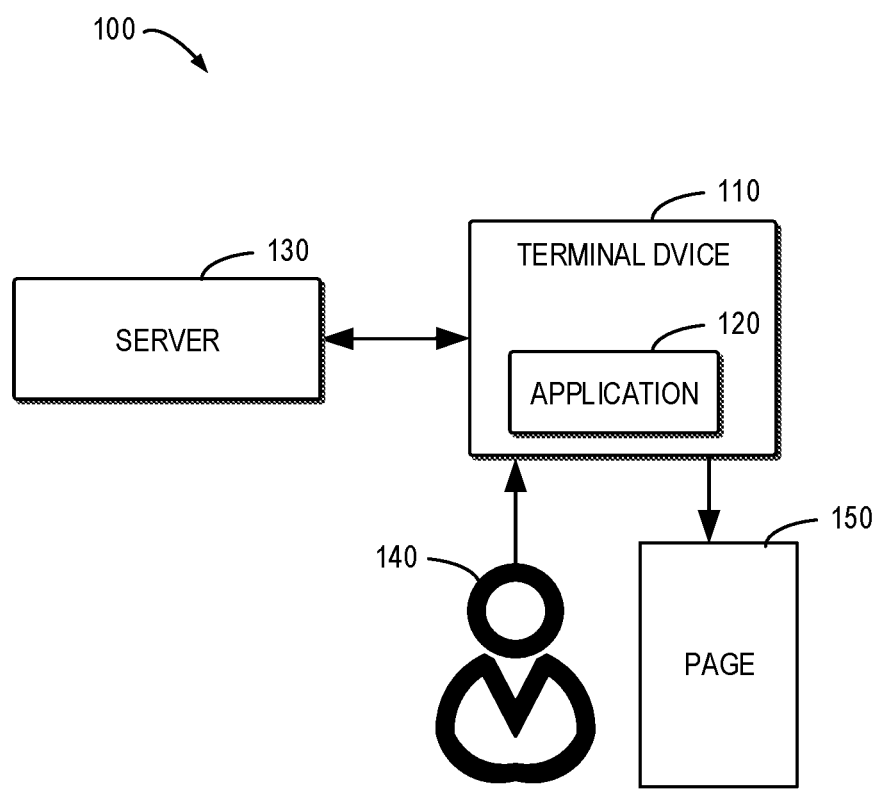
FIG. 1 shows a schematic diagram of an example environment in which the embodiments of the present disclosure can be applied.

The embodiments of the present disclosure will be described in more detail below with reference to the accompanying drawings. Although some embodiments of the present disclosure are shown in the drawings, it would be understood that the present disclosure can be implemented in various forms and should not be interpreted as limited to the embodiments described herein. On the contrary, these embodiments are provided for a more thorough and complete understanding of the present disclosure. It would be understood that the drawings and embodiments of the present disclosure are only for a purpose of illustration and are not intended to limit the scope of protection of the present disclosure.

In the description of the embodiments of the present disclosure, the term "comprising" and similar terms should be understood as open inclusion, i.e., "comprising but not limited to". The term "based on" should be understood as "at least partially based on". The term "one embodiment" or "the embodiment" should be understood as "at least one embodiment". The term "some embodiments" should be understood as "at least some embodiments". Other explicit and implicit definitions may also be comprised below.

FIG. 1 shows a schematic diagram of an example environment 100 in which the embodiments of the present disclosure can be applied. In the example environment 100, an application 120 is installed on a terminal device 110. A user 140 may interact with the application 120 via the terminal device 110 and/or devices attached to the terminal device 110. The application 120 may be a content-sharing application, that can provide the user 140 with various services related to multimedia content, comprising browsing, commenting on, reposting, creating (e.g., capturing and/or editing), and posting multimedia content. In the present disclosure, the "multimedia content" may be various forms of content, comprising videos, audio, images, image collections, text, and so on.

In the environment 100 in FIG. 1, if the application 120 is in active state, the terminal device 110 may present a page 150 of the application 120. The page 150 may comprise various types of pages which the application 120 can provide, such as multimedia content presenting pages, content creating pages, content posting pages, messaging pages, personal pages and so on. The application 120 may provide a content creating function to capture and/or create multimedia content, so as to enable users to edit captured or uploaded multimedia content, etc. The application 120 may also have a posting function that allows the user 140 to post the created multimedia content.

In some embodiments, the terminal device 110 communicates with a server 130 to implement a provision of services to the application 120. The terminal device 110 may be any type of mobile terminal, fixed terminal or portable terminal, comprising a mobile phone, a desktop computer, a laptop computer, a notebook computer, a netbook computer, a tablet computer, a media computer, a multimedia tablet, a personal communication system (PCS) device, a personal navigation device, a personal digital assistant (PDA), an audio/video player, a digital camera/camera, a positioning device, a television receiver, a radio broadcasting receiver, an e-book device, a gaming device, or any combination thereof, comprising accessories and peripherals of these devices or any combination thereof. In some embodiments, the terminal device 110 may also support any type of user-specific interface (such as a "wearable" circuit, etc.). The server 130 may be various types of computing systems/servers capable of providing computing power, comprising but not limited to a mainframe, an edge computing node, a computing device in a cloud environment, etc.

It should be understood that the description of the structure and function of the environment 100 is only for purpose of illustration and does not imply any limitations on the scope of the present disclosure.

Usually, some applications, such as content-sharing applications, will provide video and/or image-capturing functions. A variety of capturing modes may be provided to satisfy creative requirements of different users. For example, a single-segment capturing function allows users to click a capturing button to start capturing and click the button again to end capturing, thus completing an at-once video capturing. For another example, a segmented capturing mode allows users to click the capture button to start capturing, click a pause button to pause capturing, and click a stop button to end capturing.

Traditionally, layouts of the function buttons in the single-segment and segmented capturing modes tend to be different, thus requiring users to start capturing after completing mode selection. In this case, some users may lose will create and post content due to cumbersome steps of the mode selection, or because they could not proficiently grasp the use of function buttons. For applications that involve content sharing, it is desirable that users will create and post more content. Therefore, it is expected to provide guidance and incentives for users to create content, so that users may participate in content creation more conveniently and actively while different capturing requirements may be satisfied.

According to the embodiments of the present disclosure, a solution for content capturing is proposed. In the solution, after starting the capturing, both a pause control and a stop control are provided in a capturing page, and the stop control is presented in a more prominent way than the pause control. If the stop control is triggered, switching from the capturing page to a video editing page in which a complete captured video can be edited. In other words, the stop control in the capturing page can be implemented.

In this way, users are allowed to quickly capture a video, go directly to the editing page to complete editing the work, and implement subsequent posting. The prominently presented stop control reduces user operation complexity for users who have a "one take" capturing requirement, greatly improves user experience, and causes users participating in content creation more conveniently and actively.

In some embodiments, in addition to the stop control used to support "one take", the pause control in the capturing page can be used to trigger a capturing of a segmented video, thus users' requirements to pause and segmented capture may also be satisfied.

The following will continue to refer to the accompanying drawings to describe some example embodiments of the present disclosure.

Figure 2:
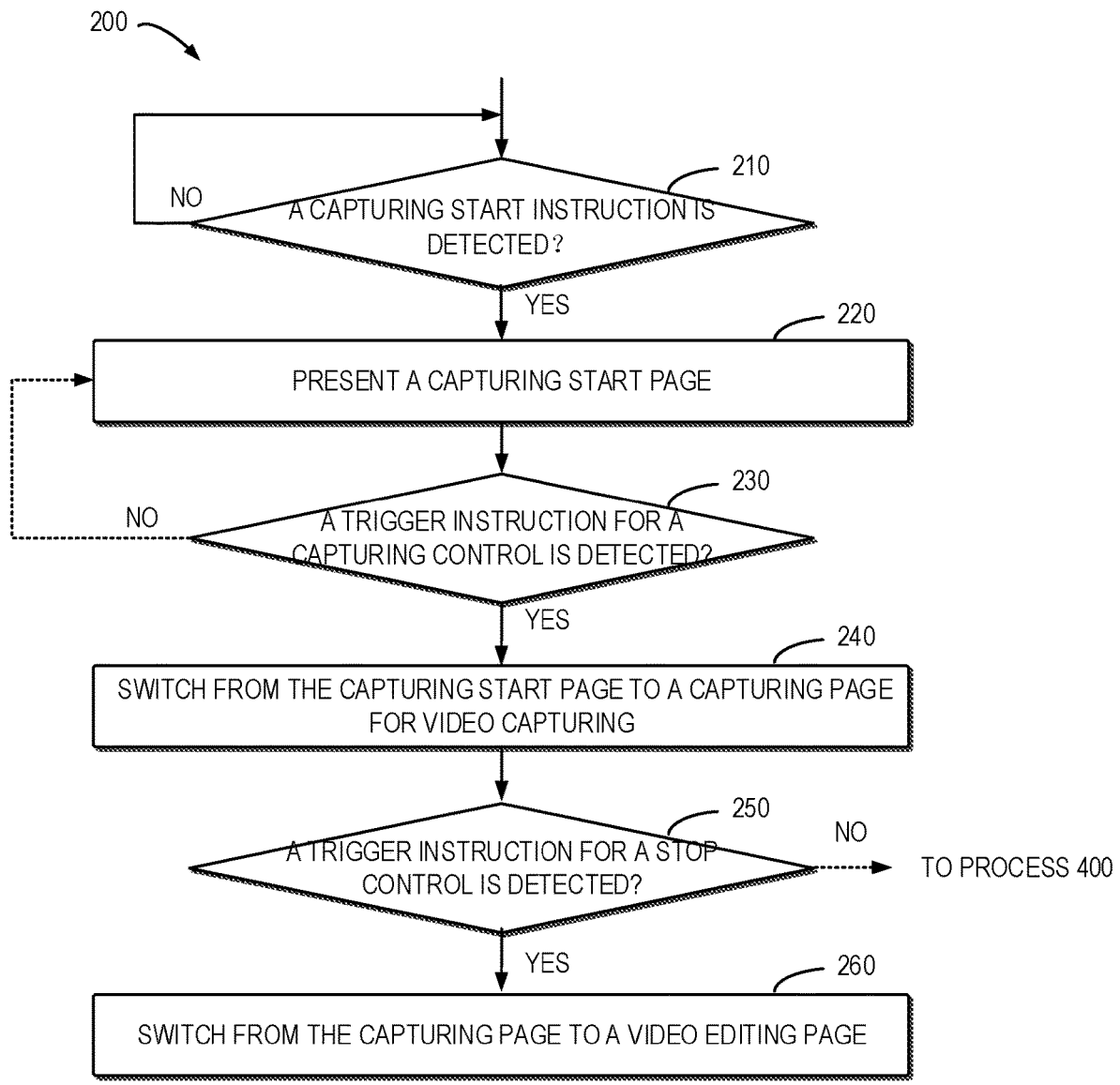
FIG. 2 shows a flowchart of a process for content capturing according to some embodiments of the present disclosure.

FIG. 2 shows a flowchart of a process 200 for content capturing according to some embodiments of the present disclosure. The process 200 may be implemented at the terminal device 110. For the sake of discussion, the process 200 will be described with reference to the environment 100 in FIG. 1.

At block 210, the terminal device 110 detects a capturing start instruction. The capturing start instruction is used to trigger a capturing start page in order to start the capturing. At block 220, in response to the capturing start instruction, the terminal device 110 presents a capturing start page, which comprises at least a capturing control.

In some embodiments, the application 120 may provide a capturing function, and the capturing start instruction may be used to start the capturing function. For the application 120, the terminal device 110 may detect the capturing start instruction in the application 120 and present the capturing start page of the application 120 in the event that the capturing start instruction is detected.

In some embodiments, a capturing start control may be provided in a currently presented page. In response to detecting a trigger on the capturing start control, the capturing start instruction may be detected. The way of the trigger on the capturing start control may, for example, comprise clicking on or selecting the capturing start control, trigger by other means such as voice, and so on. In some embodiments, besides the trigger on the capturing start control, or alternatively, the capturing start instruction may be triggered in other ways. The other trigger ways may, for example, comprise without limitation, a voice control instruction, a trigger of hardware keys, specific gestures on a particular page (e.g., swipe gestures), and so on. The embodiments of the present disclosure are not limited in this regard.

For a better understanding of embodiments of the present disclosure, description is given below with reference to an example page.

Figure 3A:
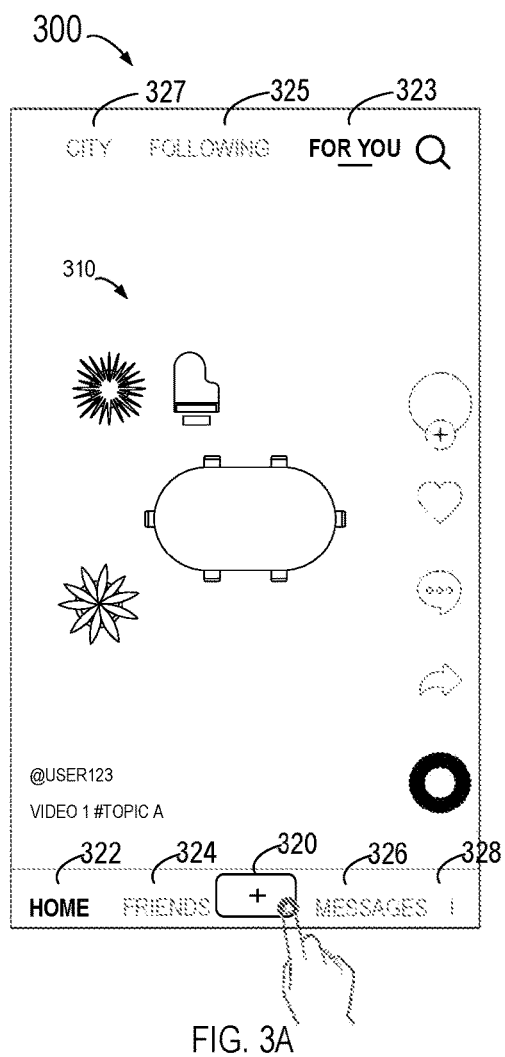
FIG. 3A to FIG. 3E show schematic diagrams of example pages related to content capturing and editing according to some embodiments of the present disclosure.

FIG. 3A shows an example page 300 of the application 120. The page 300 may be any page of the application 120. In the example of FIG. 3A, the page 300 is a content presenting page, wherein a video 310 is presented. The page 300 comprises a capturing start control 320 for a trigger on a presenting of the capturing start page in order to start a capturing.

In addition to the capturing start control 320, the page 300 further comprises a navigation tab bar for navigating to different pages. The "Lower Navigation Tab Bar" located in the lower part of the page 300, comprises navigation tabs 322, 324, 326 and 328. The navigation tab 322 has characters "Home" indicating that the navigation tab corresponds to the home page of the application 120; the navigation tab 324 has characters "Friends" indicating that the navigation tab corresponds to a friend content page of the application 120; the navigation tag 326 has characters "Messages" indicating that the navigation tag corresponds to a message page of the application 120; the navigation tag 328 has character "I" indicating that the navigation tag corresponds to the user's personal page. The "Upper Navigation Tab Bar" located in the upper part of the page 300 comprises the next level of navigation tabs to the navigation tab 322, namely navigation tabs 323, 325 and 327. The navigation tab 323 has characters "For You" indicating a recommended content page, wherein recommended content of the application 120 may be presented; the navigation tab 325 has characters "Follow" indicating a followed content page, wherein the content of followed users may be presented; the navigation tab 327 has characters "City" indicating a predefined region (for example, a certain city) content page. The page 300 corresponds to the page of the navigation tab "For You" 323 under the navigation tab "Home" 322, wherein the recommended content, i.e., the video 310, is presented.

It should be understood that the page 300 in FIG. 3A and pages in other figures to be described below are only example pages, and a variety of page designs may actually exist. Each graphic elements of the page may have different arrangements and different visual representing, wherein one or more of these elements may be omitted or replaced, and one or more other elements may also exist. The embodiments of the present disclosure are not limited in this regard. It should also be understood that in addition to the page 300 of the example, the capturing start control may be presented in other pages of the application 120, and/or the capturing start instruction may be started by other means.

Figure 3B:
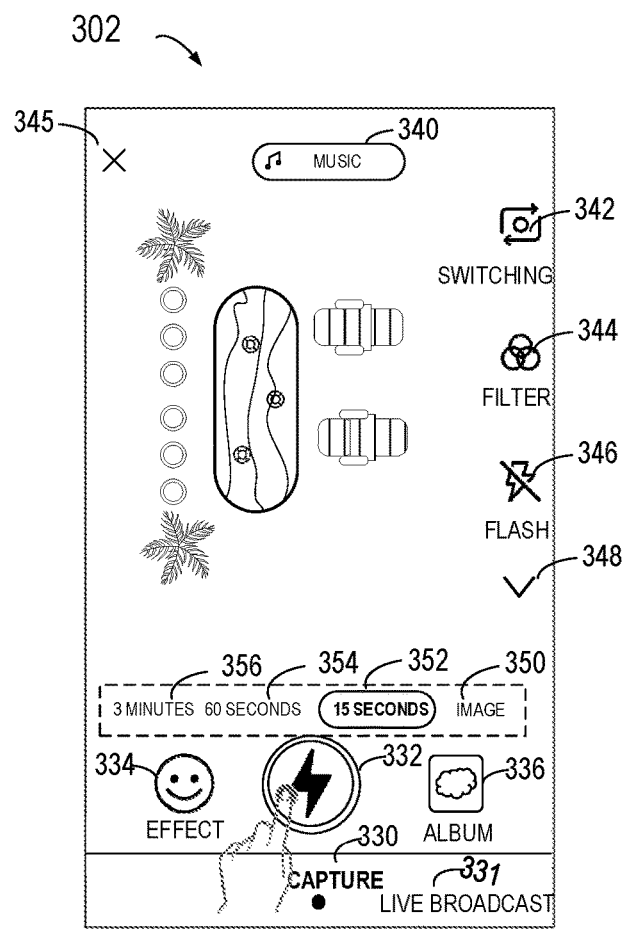

In the page 300, if a user triggers (for example, clicks on) the capturing start control 320, the terminal device 110 will detect the capturing start instruction, and present the capturing start page. FIG. 3B shows an example capturing start page 302, which comprises a capturing start control 332.

In some embodiments, the capturing start page may further provide other controls for controlling content capturing. As an example, in FIG. 3B, the capturing start page 302 may comprise: an effect control 334 for providing special visual effects added in video capturing or other content capturing; an album element 336 for accessing multimedia content in local or other data sources for subsequent creation. Further, the capturing start page 302 may further provide: a music selection function 340 for selecting music to be posted with a video or image to be captured subsequently; a lens switch function 342 for switching between the front or rear lens of a camera used for capturing; a filter function 344 to apply filters with one or more effects to videos or images captured subsequently; and a flash control function 346 for turning the flash on or off. More functions may be provided in the capturing start page 302, which are hidden and may be unfolded by an unfolding element 348. It should be understood that the functions shown here are only examples, more, less, or other functions may be provided in the capturing start page, and the embodiments of the present disclosure are not limited in this regard.

In some examples, the capturing start page 302 corresponds to a capturing entry 330, and other camera-related functional entries may also be provided therein, such as a live broadcast entry 331 shown in FIG. 3B. If the selection of the live broadcast entry 331 is detected, a live broadcast page will be switched to. In some examples, the capturing start page 302 further provides an exit option 345. If it is detected that the user has selected the exit option 345, the capturing start page 302 may be switched back to the previous page 300.

At block 230, the terminal device 110 detects a trigger instruction for the capturing control in the capturing start page. The way of a trigger on the capturing control may comprise, for example, clicking on or selecting the capturing control, trigger by other means such as voice, and so on. In the capturing start page, the terminal device 110 may periodically or otherwise detect whether the capturing control is triggered.

In response to detecting the trigger instruction for the capturing control, at block 240, the terminal device 110 switches from the capturing start page to the capturing page for video capturing. In the embodiments of the present disclosure, the capturing page comprises at least a stop control and a pause control, and the stop control is presented in a more prominent way than the pause control.

The stop control is used to control a stopping of the video capturing, so as to obtain the captured video for subsequent operations, such as editing, posting, and the like. The pause control is used to control a pausing of the video capturing and can be used to control the segmented capturing of the video to obtain a complete video comprising one or more video segments for subsequent operations.

In the present disclosure, a more prominent presenting of the stop control refers to a presenting way of the stop control in a way that is more easily discoverable and operable, and more appealing to the user's attention, than the presenting way of the pause control. One or more ways may be used to cause the presenting of the stop control more prominent than the pause control. In some embodiments, the more prominent presenting of the stop control may be reflected in the presenting position and/or appearance of the stop control. In some examples, the stop control may be presented at a location on a page that is more operable or more noticeable to a user, such as a central location on a lower or a side of the page, as compared to the pause control. In some examples, the appearance attributes, such as a size, shape, color, texture, and/or other appearance of the stop control may be configured to be more prominent and attractive to the user's attention, as compared to the pause control. For example, the stop control may have a larger size, a more prominent color, a more highlighted texture, and so forth.

In some application scenarios, more users might prefer to complete the video capturing at once so as to post the work as soon as possible. The at once capturing approach is also referred to as a "one take" capturing approach. The prominent presenting of the stop control makes it easier for users to notice it, and then trigger it to complete the at once capturing and move on to the next stage of creation. This can also further increase the user's motivation to create and post content.

In some embodiments, after switching from the capturing start page to the capturing page, the stop control in the capturing page may be obtained by deforming the capturing control. In such an implementation, the user triggers the capturing control to capture and may trigger the stop control again in almost the same position to complete video capturing. In other words, the user only needs two simple trigger operations to complete the capturing.

Figure 3C:
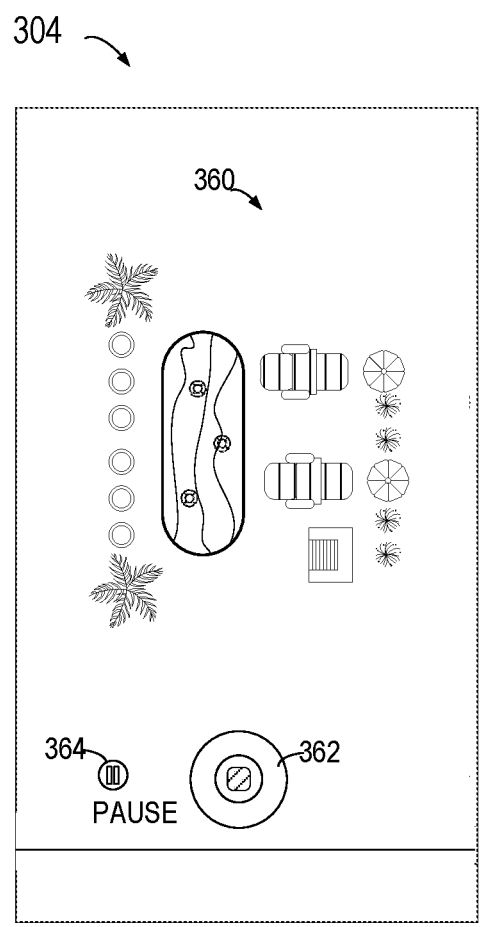

FIG. 3C shows an example capturing page 304. Specifically, if a trigger is detected for the capturing control 332 in the capturing start page 302 of FIG. 3B, switching from the capturing start page 302 to the capturing page 304 of FIG. 3C, wherein a stop control 362 and a pause control 364 are presented. The stop control 362 is presented at a lower center position of the page, which is easier for user operation. Further, the stop control 362 is obtained by deforming the capturing control 332 and is in the same position as the capturing control 332, and the size of the stop control 362 is larger than the size of the pause control 364. Therefore, compared to the pause control 364, the stop control 362 is presented in a more prominent method and is more convenient for user operation.

Video capturing can be performed in the capturing page 304 to capture a video 360. As the capturing proceeds, in some embodiments, an indication of the capturing progress may further be presented in the capturing page 304. As shown in FIG. 3G, a capturing progress bar 366 and a duration indicator 368 may be presented, both indicating the length of the currently captured video segment 361, e.g., 4 seconds.

Continuing back to the process 200, at block 250, in the capturing page, the terminal device 110 detects a trigger instruction for the stop control. The trigger on the stop control may, for example, click on or select the capturing control, trigger by other means such as voice, and so on. In response to detecting the trigger instruction for the stop control, at block 260, the terminal device 110 switches from the capturing page to a video editing page. The video editing page is used to edit the captured video.

Figure 3D:
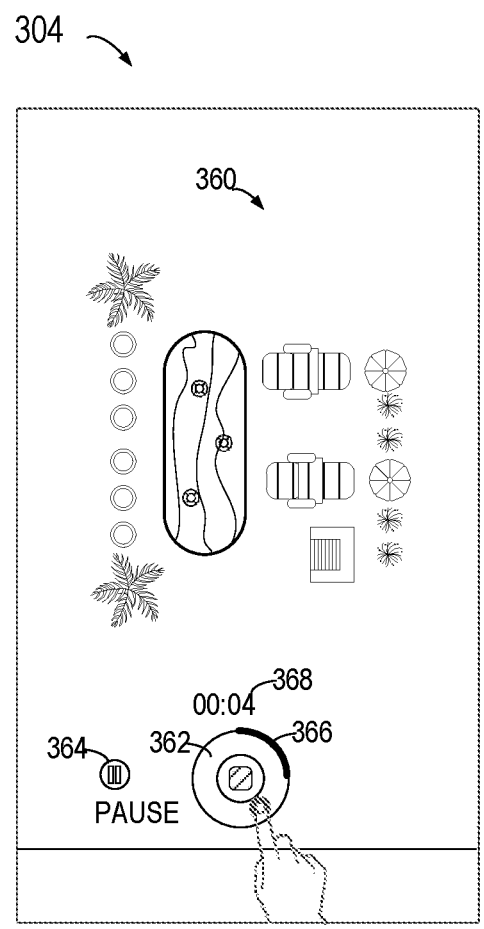
Figure 3E:
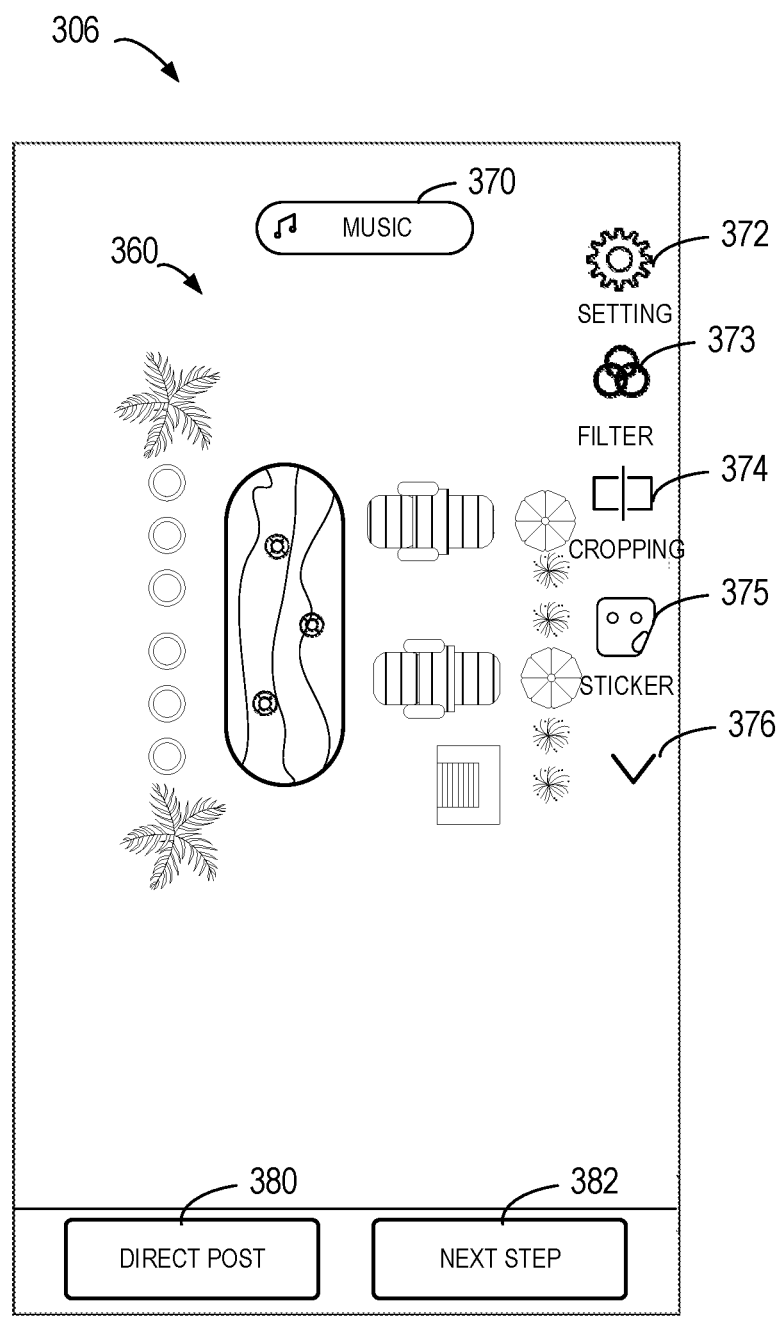

For example, if a trigger is detected for the stop control 362 in the capturing page 304 of FIG. 3D, a switch is made from the capturing page 304 to a video editing page 306 as shown in FIG. 3E. In the video editing page 306, an at-once captured video 360 may be edited. The video editing page 306 may provide one or more editing functions for users to choose from.

In embodiments of FIG. 3E, a music selection function 370 is presented. The video editing page 306 further provides: a setting function 372 for providing one or more setting options; a filter function 373 for applying filters with one or more effects; a cropping function 374 for cropping one or more frames of a video; and a sticker function 375 for adding one or more stickers. The editing page 306 may further provide more editing functions that are hidden and may be unfolded by an unfolding element 376. It should be understood that the editing functions shown here are only examples and that more, less, or other editing functions may be provided, and the embodiments of the present disclosure are not limited in this regard.

In some embodiments, the video editing page may also present posting controls for a trigger on posting controls for the captured video. For example, in FIG. 3E, a direct posting control 380 is presented in the video editing page 306, a trigger on the direct posting control will cause the video 360 or edited video 360 to be posted immediately. In some examples, after posting the video, the video editing page 306 is switched to the content presenting page of the application 120.

In the example in FIG. 3E, the video editing page 306 further presents a posting control 382. In response to a trigger instruction of the posting control 382, the video editing page 306 will be switched to a posting page (not shown), wherein the user can enter more content, such as text, tags, etc., to be posted with the video 360 or edited video 360.

As mentioned above, by a direct trigger on a stop control of the capturing page, the "one take" video capturing can be completed, and quickly go to a page for the subsequent processing of the video, such as the editing page and the subsequent posting page. For users who have a requirement for quick sharing and "one take" capturing, convenient capturing entries and convenient operations may be provided.

In addition to the stop control, as mentioned earlier, the capturing page also comprises a pause control for controlling segmented capturing. The use of the pause control is described in more detail below. In the embodiments of the present disclosure, by providing the pause control and the stop control in the capturing page after starting the capturing, the capturing function can be integrated without additional selection operations to start capturing. It also enables different users to perform a single-segment capturing or a segmented capturing as required. This avoids the operation complexity caused by different control settings for single-segment and segmented capturing, simplifies user operation, makes it easier for users to understand and use the capturing function, and facilitates content creation and distribution.

In some embodiments, the selection of the capturing mode may also be provided in the capturing start page. In the capturing start page 304 shown in FIG. 3B, multiple video capturing modes 352, 354, and 356 may be indicated. One or more video capturing modes may have video duration upper limit per se, which are used to limit the maximum total duration of a video capturing in each mode. For example, the upper limit of video duration of the video capturing mode 352 is 15 seconds, the upper limit of video duration of the video capturing mode 354 is 30 seconds, and the upper limit of video duration of the video capturing mode 356 is 3 minutes. Note that the upper limit of video durations here are examples only. In different applications, other upper limits of video durations may be provided as required, and the selection of more or less upper limits of video durations may be provided.

In some embodiments, in addition to providing a video capturing mode with an upper limit of video duration, or alternatively, other video capturing modes may further be provided, such as a video capturing mode with a specific visual effect. The embodiments of the present disclosure are not limited in this regard.

In some embodiments, a target video capturing mode may be determined based on user selection. In some embodiments, a default target video capturing mode may be provided. For example, in FIG. 3B, the video capturing mode 352 with an upper limit of video duration of 15 seconds may be set as the default target video capturing mode. The user may also select other video capturing modes 354 or 356 as required.

After the target video capturing mode is selected, in response to detecting the capturing control 332, switch from the capturing start page to the capturing page corresponding to the target video capturing mode. For example, if the target video capturing mode has an upper limit of video duration, a capturing progress indication in the capturing page, such as the duration progress bar 366 shown in FIG. 3D, will be configured in accordance with the upper limit of video duration. In video capturing modes with a specific visual effect, the captured video in real time may be processed in the capturing page according to the specific visual effect.

Example embodiments related to a trigger on the pause control in the capturing page, as well as other capturing-related example embodiments, will continue to be discussed below.

Figure 4:
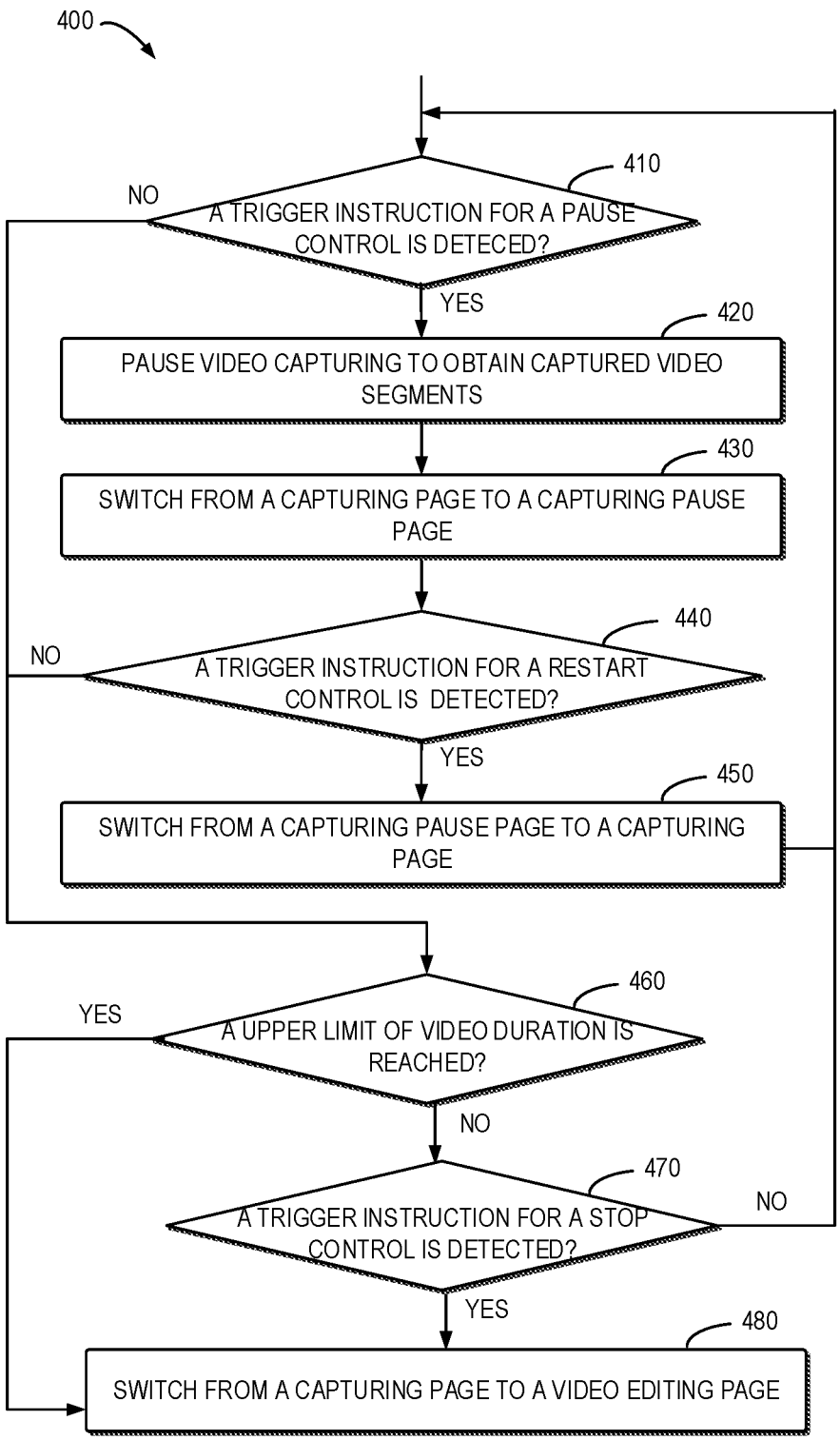
FIG. 4 shows a flowchart of a process for content capturing according to some further embodiments of the present disclosure.

FIG. 4 shows a flowchart of a process 400 for content capturing according to some further embodiments of the present disclosure. The process 400 may be implemented at the terminal device 110.

At block 410, the terminal device 110 detects a trigger instruction for a pause control in the capturing page. The trigger of the pause control may comprise, for example, clicking on or selecting the capturing start control, trigger by other means such as voice, and so on.

In some embodiments, if a trigger instruction for the stop control is not detected at the block 250 in the process 200, the terminal device 110 may further detect whether the pause control is triggered. It should be understood that although detection of a trigger for the stop control is described first and detection of a trigger for the pause control is described second, detection of the triggers of the stop control and the pause control may in fact be performed side-by-side or in reverse order.

In response to detecting a trigger instruction for the pause control, such as a user clicking on the pause control, at block 420, the terminal device 110 pauses the video capturing to obtain captured video segments. In some examples, a first video segment may be obtained that comprises captured video content during a period after capturing starts, for example, after the capturing control is triggered until the pause control is triggered.

By the trigger on the pause control, the segmented capturing can be entered. In a segmented capturing scenario, a user may capture one or more segments as required. Users are allowed to shift the scene, wait for the timing of the capturing, etc. while capturing in the segmented capturing.

Additionally, in response to detecting a trigger instruction for the pause control, at block 430, switching from a capturing page to a capturing pause page. The pause control is stopped from being presented while the video capturing is paused. A restart control is presented in the capturing pause page, wherein the restart control is used to resume (i.e., restart) video capturing. In addition to the restart control, a stop control may be presented in the capturing pause page for stopping the video capturing.

Figure 5A:
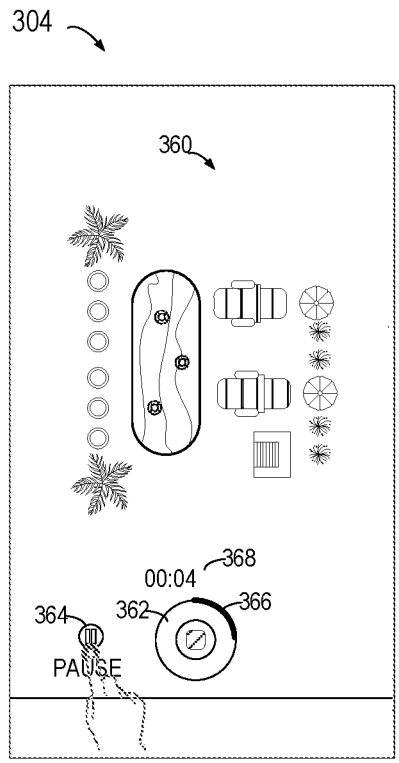
FIG. 5A to FIG. 5G show schematic diagrams of example pages related to content capturing and editing according to some further embodiments of the present disclosure.
Figure 5B:
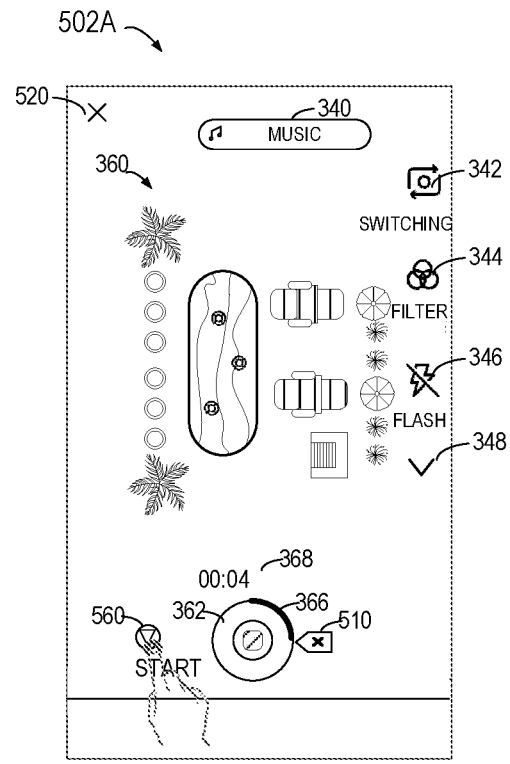

FIG. 5A shows the capturing page 304, wherein after a period of capturing, such as 4 seconds, a user trigger on the pause control 364 is detected. In response to the trigger on the pause control 364, the video capturing is paused and the currently captured video, such as video 360, is determined to be a first video segment. Further, the application 120 is switched from the capturing page 304 to a capturing pause page 502A as shown in FIG. 5B.

In some embodiments, the stop control in the capturing pause page may maintain the same or similar presenting way as the stop control in the capturing page. In some embodiments, the pause control may be deformed into a restart control. In this way, the stop control in the capturing pause page is still presented in a more prominent way than the pause control. As shown in FIG. 5B, the stop control 362 continues to be presented in the same way as the capturing page 304 in the capturing pause page 502A, and the pause control 364 in the capturing page 304 is deformed into a restart control 560 in the capturing pause page 502A.

In some embodiments, given that the trigger on the pause control 364 implies that the user expects a segmented capturing and both the restart control and the pause control may be used more. Thus, it is possible to present the restart control in the capturing pause page in a more prominent way than the stop control. In this way, the restart control may be more attractive to the user and easier to find and operate compared to the stop control.

The prominent presenting way of the restart control may be similar to the prominent presenting way of the stop control discussed previously. For example, the more prominent presenting of the restart control may be reflected in the presenting position and/or appearance of the restart control. In some examples, the restart control may be displayed in a location on the page that is easier for a user to manipulate or easier to notice, such as a central location on the lower or side of the page, as compared to the stop control. In some examples, the appearance properties, such as size, shape, color, texture, and/or other appearance of the restart control may be configured to be more prominent and more appealing to the user's attention, as compared to the stop control. For example, the restart control may have a larger size, a more prominent color, a more prominent texture, and so forth.

Figure 5C:
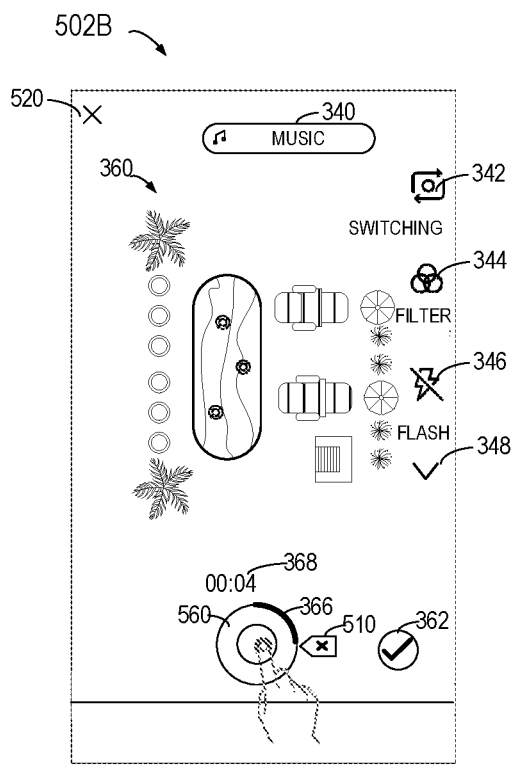

FIG. 5C shows a capturing pause page 502B in another example, wherein the restart control 560 for resuming video capturing and the stop control 362 for stopping video capturing are presented. The restart control 560 is obtained by deforming the stop control in the capturing page 304, and the size oft the restart control 560 is larger than the size of the stop control 362. Therefore, compared to the stop control 362, the restart control 560 is presented in a more prominent way and is more convenient for user operation.

In addition to the presenting way of the restart control and the stop control shown in FIG. 5B and FIG. 5C, the two controls may be presented in the capturing pause page in other ways, and the embodiments of the present disclosure are not limited herein.

In some embodiments, the capturing pause page may provide other functions in addition to the restart control and the stop control. As shown in FIG. 5B and FIG. 5C, the capturing pause pages 502A and 502B may provide multiple functions similar to the capturing start page 302, for example, a music selection function 340, a lens switch function 342, a filter function 344, a flash control function 346, an unfolding element 348. It should be understood that the functions shown here are only examples, more, less, or other functions may be provided in the capturing pause page, and the embodiments of the present disclosure are not limited in this regard.

Back to the process 400, in the capturing pause page, the terminal device 110 detects a trigger instruction for the restart control at block 440. The trigger on the pause control may comprise, for example, clicking on or selecting the capturing start control, trigger by other means such as voice, and so on. In response to detecting the trigger instruction for the restart control, at block 450, the terminal device 110 switches from the capturing pause page to the capturing page to resume video capturing. In the capturing page, the pause control may be presented and the presenting of the restart control may stop. Further, the stop controls may continue to be presented in the capturing page.

In some embodiments, the restart control in the capturing pause page may be deformed to a pause control, or the pause control may be provided at another location in the page.

Figure 5D:
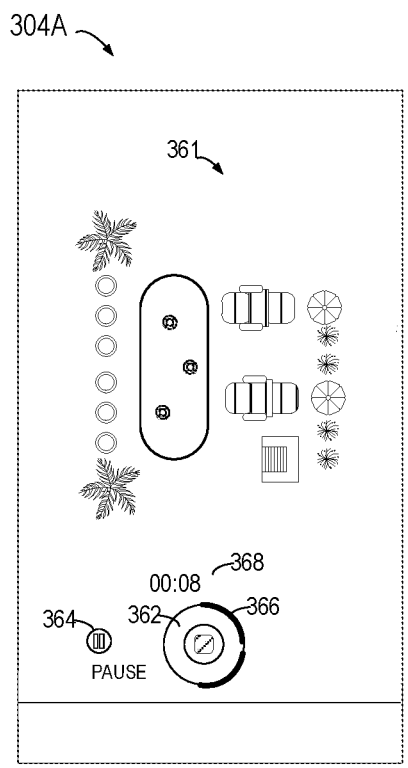

For example, if a trigger to the restart control 560 is detected in the capturing pause page 502A shown in FIG. 5B, a switch may be made to the capturing page 304A as shown in FIG. 5D, wherein the restart control 560 of FIG. 5B is deformed into the pause control 364 of FIG. 5D, which is rendered similarly to that in the capturing page 304 of FIG. 5A. The capturing page 304A also continues to maintain the presenting of the stop control 362.

Figure 5E:
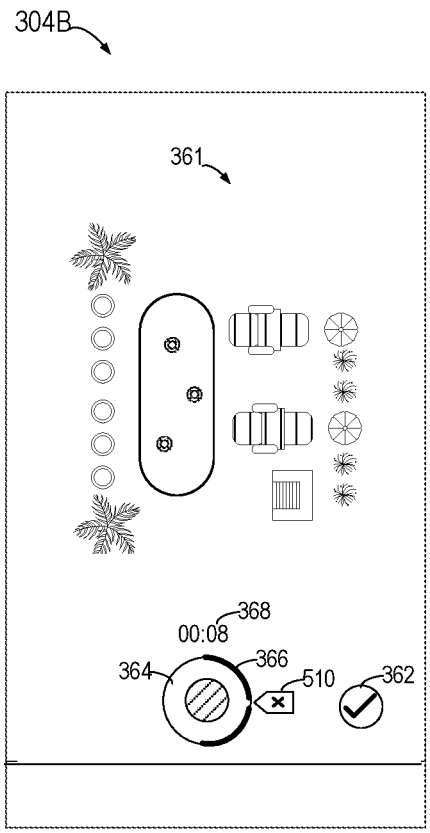

In some embodiments, as mentioned above, the pause control may be used more often by the user during segmented capturing, and thus the pause control may be presented in a more prominent way than the stop control after returning to the capturing page from the capturing pause page. In this way, the user may notice the pause control more easily and may operate the pause control more conveniently. The prominent presenting way of the pause control at this point may be similar to, or different from, the prominent presenting way of the restart control discussed previously. In some embodiments, the restart control in the capturing pause page can be deformed into a pause control in the capturing page. For example, if a trigger to the restart control 560 is detected in the capturing pause page 502B shown in FIG. 5C, a switch can be made to the capturing page 304B as shown in FIG. 5E, wherein the restart control 560 in FIG. 5C is deformed into the pause control 364 in FIG. 5E, and the presenting of the stop control 362 is also maintained. At this time, the presenting way of the pause control 364 in the capturing page 304B may be different from the presenting way in the capturing page 304 of FIG. 5A.

In the capturing page, for example, in the capturing pages 304A and 304B of FIG. 5D and FIG. 5E, the video 361 may continue to be captured. Further, the terminal device 110 may continue to detect triggers against the pause control and the restart control in the current capturing page. For example, after block 450 is executed, the terminal device 110 may return to block 410. if a trigger instruction is again detected for the pause control, video capturing is again paused, at which point a second video segment may be obtained. The second video segment comprises the video content captured between the time the previous restart control was triggered and the time the current pause control was triggered. By looping the process, multiple video segments can be captured.

In some embodiments, at block 470, the terminal device 110 detects a trigger instruction for the stop control in the capturing pause page or in the capturing page. If a trigger instruction is detected for the stop control, a switch is made from the capturing page to a video editing page. The captured video may be edited in the video editing page, which may be a video that comprises one or more video segments.

Figure 5F:
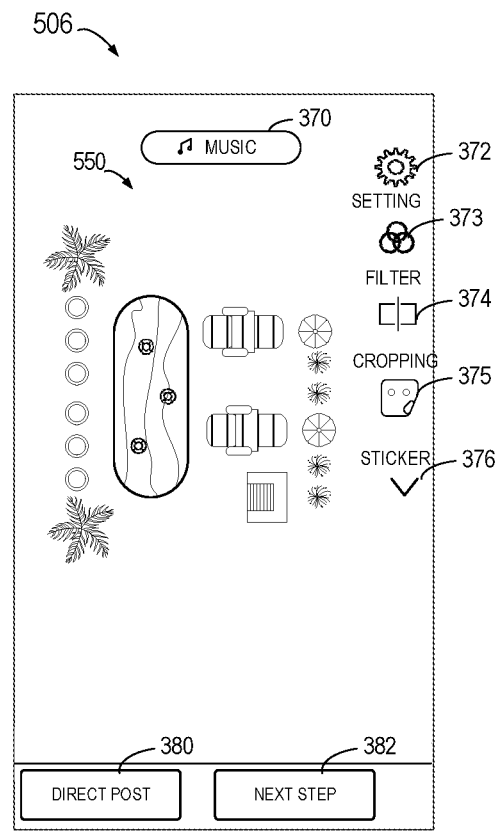

For example, if a trigger instruction for the stop control 362 is detected in the capturing pause page 502A of FIG. 5B, the capturing pause page 502B shown in FIG. 5C, the capturing page 304A 2 of FIG. 5D, or the capturing page 304B of FIG. 5E, the page is switched to a video editing page 506 as shown in FIG. 5F, which is similar to the video editing page shown in FIG. 3E 306, wherein the captured video 550 can be edited. if the video editing page 506 is switched from the capturing pause page 502A or the capturing pause page 502B, the editable video 550 comprises the captured first video segment. If switching to the video editing page 506 from the capturing page 304A or the capturing page 304B, the editable video 550 comprises both video segments captured. Certainly, if continues segmented capturing, a video with more segments can be formed for editing.

In some embodiments, if a selected target video capturing mode has an upper limit of video duration, or if there is a default upper limit of video duration set in the video capturing, during the video capturing process, the terminal device 110 detects in the block 460 whether the total duration of the captured video reaches the upper limit of video duration. In some embodiments, the total duration of the captured video may be the sum of the durations of one or more currently obtained video segments. In some embodiments, if a trigger instruction to the pause control in the capturing page is not detected during the capturing process, for example, the user does not pause the video capturing, it is also possible to determine whether the total duration of the captured video reaches the upper limit of the video duration.

Figure 5G:
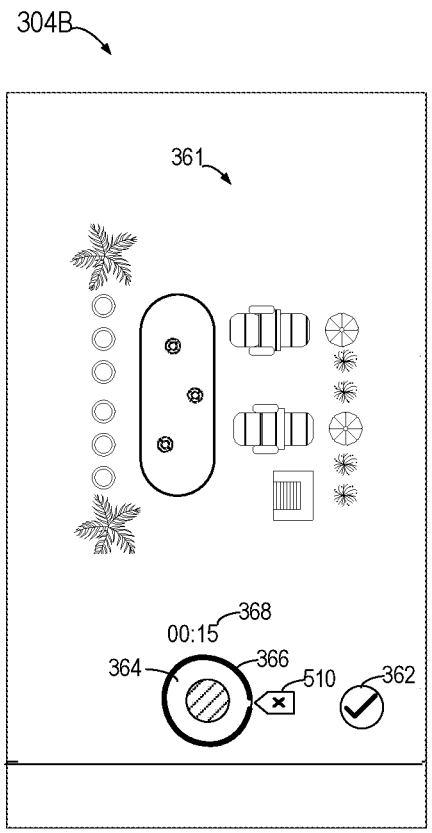

If it is detected that the total duration of the captured video reaches the video duration limit, at block 480, the terminal device 110 switches from a capturing page to a video editing page. The captured video may be edited in the video editing page, which may be a video that comprises one or more video segments or may be a video capturing at once. For example, as shown in FIG. 5G, the video 361 is continuously captured in the capturing page 304B until the video duration limit of 15 seconds for the current video capturing mode is reached. At this point, the page automatically switches to a video editing page 506, as shown in FIG. 5F, wherein the video 550 captured up to a total of 15 seconds can be edited.

In some embodiments, delete controls for the obtained video segments are also provided in the capturing pause page, such as a delete control 510 shown in FIG. 5B and FIG. 5C. By a trigger on the delete control 510, the captured video segments can be deleted. In the case where a plurality of video segments are captured, each of the captured video segments is sequentially deleted by successively triggering the delete control 510 in an order opposite to the order in which they were captured.

It should be understood that while the detection of the trigger on the pause control and the restart control and the detection of the upper limit of the video duration are described in the process 400 in a certain order, the three detections may be performed side by side, or in reverse order in practice.

Figure 6A:
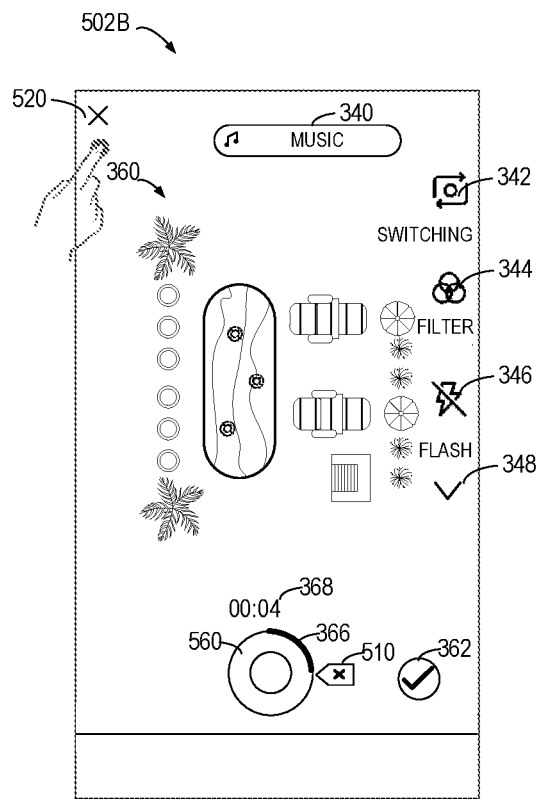
FIG. 6A to FIG. 6B show schematic diagrams of example pages related to content capturing and editing according to some further embodiments of the present disclosure.
Figure 6B:
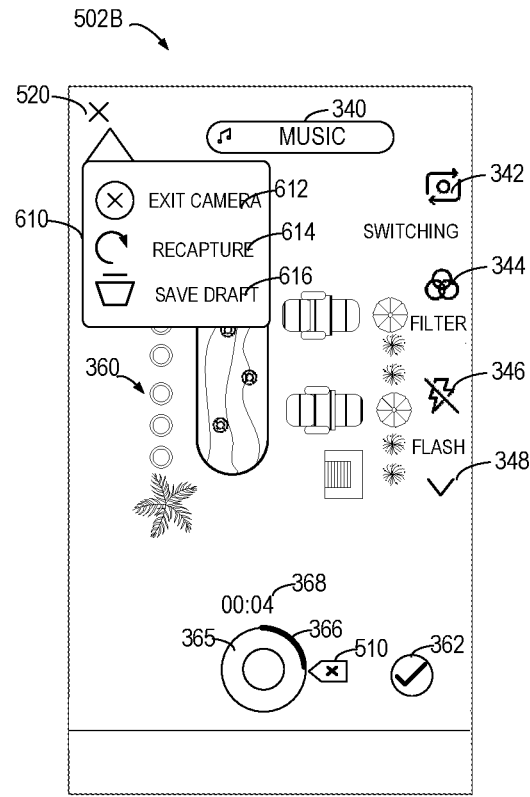

In some embodiments, an exit option may also be provided in the capturing pause page, as an exit option 520 shown in the capturing pause page 502A of FIG. 5B and the capturing pause page 502B of FIG. 5C. If a selection of the exit option 520 is detected, a variety of exit ways may be provided for the user to select. As shown in FIG. 6A, assuming that user selection of the exit option 520 is detected in the capturing pause page 502B, a pop-up window 610 may be provided as shown in FIG. 6B, wherein it comprises a plurality of exit modes 612, 614, and 616. The exit mode 612, "Exit Camera," indicates exiting directly from the capturing mode, for example, returning to the page 300 as shown in FIG. 3A. The exit mode 614 "Recapture" indicates returning to a capturing start page, for example, capturing start page 302 shown in FIG. 3B, to start a new capturing process. The exit mode 616 "Save Draft" indicates saving a currently captured video to a draft box upon exit for subsequent use. The user may select the appropriate exit mode as required.

Figure 7A:
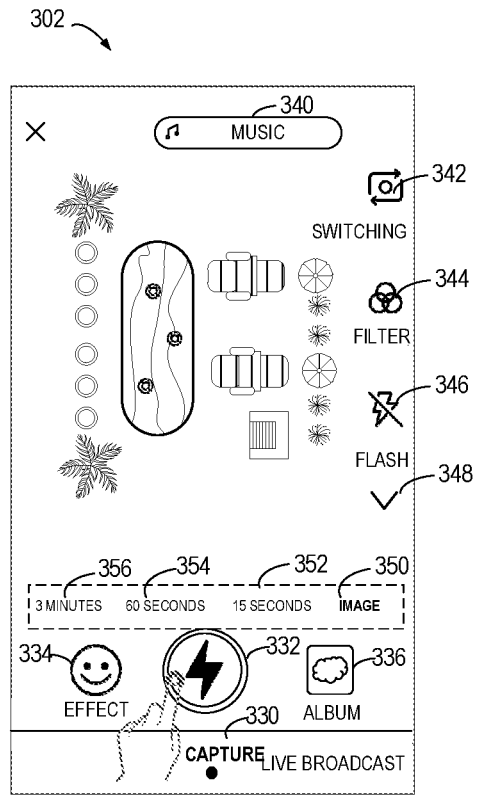
FIG. 7A to FIG. 7B show schematic diagrams of example pages related to content capturing and editing according to some further embodiments of the present disclosure.

In some embodiments, an indication of the image capturing mode may also be provided on the capturing page. For example, in addition to the plurality of video capturing modes 352, 354, and 356, the capturing start page 302 of FIG. 3B indicates an image capture mode 350. if it is determined that an image capture mode is selected, an image capture instruction may be detected to control the capture of an image. In some embodiments, the image capture instruction may be started, for example, by the trigger on a capture control in the capturing start page. As shown in FIG. 7A, assume that in the capturing start page 302, the user selects the image capturing mode 350 and triggers the capturing control 332. At this point, the terminal device 110 may detect the image capturing instruction and control the camera to capture the image.

Figure 7B:
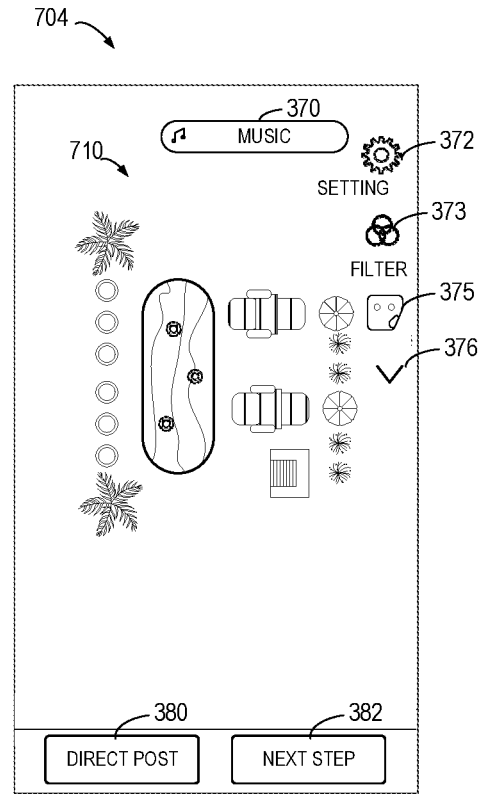

In some embodiments, after capturing an image, an image editing page is entered directly which is used to edit the captured image. FIG. 7B shows an example image editing page 704, wherein a captured image 710 can be edited. The image editing page 704 may be similar to the video editing page 306 or 506, but provided therein are editing functions suitable for application to the image, for example, a music selection function 370, a setting function 372, a filter function 373, a sticker function 375, an expansion element 376 for unfolding more functions, and so on. expanding elements 376, and so on. The image editing page 704 also provides a direct posting control 380 and a posting control 382.

Figure 8:
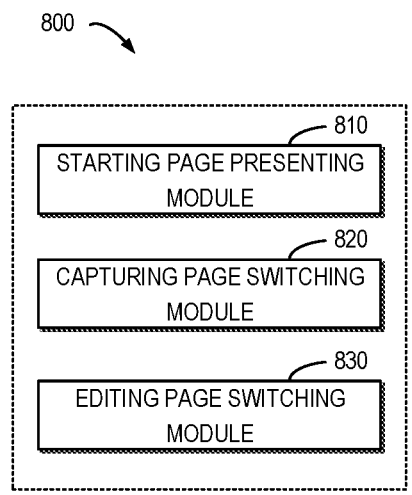
FIG. 8 shows a block diagram of an apparatus for content capturing according to some embodiments of the present disclosure.

FIG. 8 shows a schematic structural block diagram of an apparatus 800 for content capturing according to some embodiments of the present disclosure. The apparatus 800 may be implemented or comprised in the terminal device 110. Each module/component in the apparatus 800 may be implemented by hardware, software, firmware, or any combination thereof.

The apparatus 800 comprises a starting page presenting module 810 configured to, in response to a capturing start instruction, present a capturing start page, the capturing start page comprising at least a capturing control. The apparatus 800 also comprises a capturing page switching module 820 configured to, in response to detecting a trigger instruction for the capturing control, switch from the capturing start page to a capturing page for video capturing, the capturing page comprising at least a stop control and a pause control, and the stop control being presented in a more prominent way than the pause control. The apparatus 800 also comprises an editing page switching module 830 configured to, in response to detecting a trigger instruction for the stop control, switch from the capturing page to a video editing page, the video editing page being used to edit a captured video.

In some embodiments, the capturing control is deformed into a stop control.

In some embodiments, the apparatus 800 further comprises a pause controlling module configured to: in response to detecting a trigger instruction for the pause control, pause the video capturing to obtain a first captured video segment; and switching from the capturing page to a capturing pause page, the capturing pause page comprising a restart control and a stop control, and the pause control being stopped from being presented in the capturing pause page.

In some embodiments, the apparatus 800 further comprises a restart controlling module configured to: in response to detecting a trigger instruction for the restart control, switch from the capturing pause page to the capturing page to resume video capturing, the capturing page comprising the pause control and the stop control, and the restart control being stopped from being presented in the capturing page. In some embodiments, the pause controlling module is further configured to: in response to detecting another trigger instruction for the pause control, pause the video capturing to obtain a second captured video segment, and switching from the capturing page to the capturing pause page.

In some embodiments, the pause controlling module comprises: a first control presenting module configured to present the restart control in a more prominent way than the stop control in the capturing pause page.

In some embodiments, the restart controlling module comprises: a second control presenting module configured to present the pause control in a more prominent way than the stop control in the capturing page.

In some embodiments, the capturing start page further comprises an indication of a plurality of video capturing modes. In some embodiments, the capturing page switching module comprises: a mode determining module configured to determine a selection of a target video capturing mode among the plurality of video capturing modes; and a mode-based switching module configured to switch from the capturing start page to a capturing page corresponding to the target video capturing mode in response to detecting a trigger instruction for the capturing control.

In some embodiments, the target video capturing mode has a respective upper limit of video duration. In some embodiments, the apparatus 800 further comprises: a duration-based switching module configured to, in response to detecting that the total duration of the captured video reaches the upper limit of video duration of the target video capturing mode, switch from a capturing page to a video editing page during video capturing.

In some embodiments, the capturing start page further comprises an indication of the image capturing mode. In some embodiments, the apparatus 800 further comprises: an image selection determining module configured to determine a selection of an image capturing mode; an image capturing controlling module configured to, in response to detect the image capturing instruction, control the capturing of an image; and an image editing entry module configured to enter an image editing page, the image editing page is used to edit the captured image.

Figure 9:
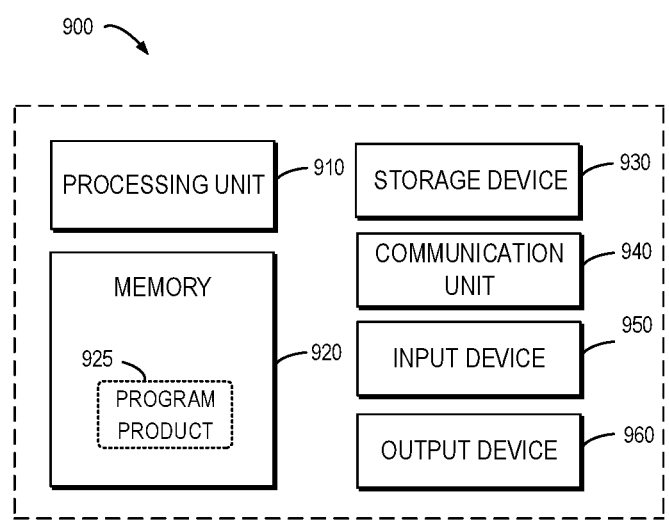
FIG. 9 shows a block diagram of an electronic device capable of implementing one or more embodiments of the present disclosure.

FIG. 9 shows a block diagram of an electronic device 900 in which one or more embodiments of the present disclosure may be implemented. It would be understood that the electronic device 900 shown in FIG. 9 is only an example and should not constitute any restriction on the function and scope of the embodiments described herein. The electronic device 900 shown in FIG. 9 may be used to implement the terminal device 110 of FIG. 1.

As shown in FIG. 9, the electronic device 900 is in the form of a general computing device. The components of the electronic device 900 may include, but are not limited to, one or more processors or processing units 910, a memory 920, a storage device 930, one or more communication units 940, one or more input devices 950, and one or more output devices 960. The processing unit 910 may be an actual or virtual processor and can execute various processes according to the programs stored in the memory 920. In a multi-processor system, multiple processing units execute computer executable instructions in parallel to improve the parallel processing capability of the electronic device 900.

The electronic device 900 typically includes a variety of computer storage medium. Such medium may be any available medium that is accessible to the electronic device 900, including but not limited to volatile and non-volatile medium, removable, and non-removable medium. The memory 920 may be volatile memory (for example, a register, cache, a random access memory (RAM)), a non-volatile memory (for example, a read-only memory (ROM), an electrically erasable programmable read-only memory (EEPROM), a flash memory) or any combination thereof. The storage device 930 may be any removable or non-removable medium, and may include a machine-readable medium, such as a flash drive, a disk, or any other medium, which can be used to store information and/or data (such as training data for training) and can be accessed within the electronic device 900.

The electronic device 900 may further include additional removable/non-removable, volatile/non-volatile storage medium. Although not shown in FIG. 9, a disk driver for reading from or writing to a removable, non-volatile disk (such as a "floppy disk"), and an optical disk driver for reading from or writing to a removable, non-volatile optical disk can be provided. In these cases, each driver may be connected to the bus (not shown) by one or more data medium interfaces. The memory 920 may include a computer program product 925, which has one or more program modules configured to perform various methods or acts of various embodiments of the present disclosure.

The communication unit 940 communicates with a further computing device through the communication medium. Further, functions of components in the electronic device 900 may be implemented by a single computing cluster or multiple computing machines, which can communicate through a communication connection. Therefore, the electronic device 900 may be operated in a networking environment using a logical connection with one or more other servers, a network personal computer (PC), or another network node.

The input device 950 may be one or more input devices, such as a mouse, a keyboard, a trackball, etc. The output device 960 may be one or more output devices, such as a display, a speaker, a printer, etc. The electronic device 900 may also communicate with one or more external devices (not shown) through the communication unit 940 as required. The external device, such as a storage device, a display device, etc., communicate with one or more devices that enable users to interact with the electronic device 900, or communicate with any device (for example, a network card, a modem, etc.) that makes the electronic device 900 communicate with one or more other computing devices. Such communication may be executed via an input/output (I/O) interface (not shown).

According to example implementation of the present disclosure, a computer-readable storage medium is provided, on which a computer-executable instruction or computer program is stored, wherein the computer-executable instructions or the computer program is executed by the processor to implement the method described above.

According to example implementation of the present disclosure, a computer program product is also provided. The computer program product is physically stored on a non-transient computer-readable medium and includes computer-executable instructions, which are executed by the processor to implement the method described above.

Various aspects of the present disclosure are described herein with reference to the flow chart and/or the block diagram of the method, the device, the equipment, and the computer program product implemented in accordance with the present disclosure. It would be understood that each block of the flowchart and/or the block diagram and the combination of each block in the flowchart and/or the block diagram may be implemented by computer-readable program instructions.

These computer-readable program instructions may be provided to the processing units of general-purpose computers, special computers, or other programmable data processing devices to produce a machine that generates a device to implement the functions/acts specified in one or more blocks in the flow chart and/or the block diagram when these instructions are executed through the processing units of the computer or other programmable data processing devices. These computer-readable program instructions may also be stored in a computer-readable storage medium. These instructions enable a computer, a programmable data processing device and/or other devices to work in a specific way. Therefore, the computer-readable medium containing the instructions includes a product, which includes instructions to implement various aspects of the functions/acts specified in one or more blocks in the flowchart and/or the block diagram.

The computer-readable program instructions may be loaded onto a computer, other programmable data processing apparatus, or other devices, so that a series of operational steps can be performed on a computer, other programmable data processing apparatus, or other devices, to generate a computer-implemented process, such that the instructions which execute on a computer, other programmable data processing apparatus, or other devices implement the functions/acts specified in one or more blocks in the flowchart and/or the block diagram.

The flowchart and the block diagram in the drawings show the possible architecture, functions and operations of the system, the method and the computer program product implemented in accordance with the present disclosure. In this regard, each block in the flowchart or the block diagram may represent a part of a module, a program segment, or instructions, which contains one or more executable instructions for implementing the specified logic function. In some alternative implementations, the functions marked in the block may also occur in a different order from those marked in the drawings. For example, two consecutive blocks may actually be executed in parallel, and sometimes can also be executed in a reverse order, depending on the function involved. It should also be noted that each block in the block diagram and/or the flowchart, and combinations of blocks in the block diagram and/or the flowchart, may be implemented by a dedicated hardware-based system that performs the specified functions or acts, or by the combination of dedicated hardware and computer instructions.

Each implementation of the present disclosure has been described above. The above description is exemplary, not exhaustive, and is not limited to the disclosed implementations. Without departing from the scope and spirit of the described implementations, many modifications and changes are obvious to ordinary skill in the art. The selection of terms used in this article aims to best explain the principles, practical application or improvement of technology in the market of each implementation, or to enable other ordinary skill in the art to understand the various implementations disclosed herein.

We claim:

1. A method of content capturing, comprising: in response to a capturing start instruction, presenting a capturing start page, the capturing start page comprising at least a capturing control at a first position; in response to detecting a trigger instruction for the capturing control, switching from the capturing start page to a capturing page for video capturing, the capturing page comprising at least a stop control and a pause control, and the stop control at the first position being highlighted more than the pause control, wherein the pause control is located at a second position different from the first position; in response to detecting a trigger instruction for the stop control, switching from the capturing page to a video editing page, the video editing page being used to edit a captured video; and in response to detecting a trigger instruction for the pause control, switching from the capturing page to a capturing pause page, the capturing pause page comprising a restart control and the stop control, and the pause control being stopped from being presented in the capturing pause page; wherein the restart control at the first position is presented highlighted than the stop control in the capturing pause page, and the stop control is located at a third position different from the first position.

2. The method of claim 1, wherein the capturing control is deformed to the stop control.

3. The method of claim 1, further comprising:
in response to detecting a trigger instruction for the pause control,
causing the video capturing to pause to obtain a first captured video segment.

4. The method of claim 3, further comprising:
in response to detecting a trigger instruction for the restart control,
switching from the capturing pause page to the capturing page to resume video capturing, the capturing page comprising the pause control and the stop control, and the restart control being stopped from being presented in the capturing page; and
in response to detecting another trigger instruction for the pause control,
causing the video capturing to pause to obtain a second captured video segment, and
switching from the capturing page to the capturing pause page.

5. The method of claim 4, wherein switching from the capturing pause page to the capturing page comprises: presenting the pause control in the capturing page more highlighted than the stop control.

6. The method of claim 1, wherein the capturing start page further comprises an indication of a plurality of video capturing modes; and wherein switching from the capturing start page to the capturing page comprises:
determining a selection of a target video capturing mode of the plurality of video capturing modes; and
in response to detecting the trigger instruction for the capturing control, switching from the capturing start page to a capturing page corresponding to the target video capturing mode.

7. The method of claim 6, wherein the target video capturing mode has a respective upper limit of video duration, and wherein the method further comprises:
in response to detecting that a total duration of a captured video reaches the upper limit of video duration of the target video capturing mode, switching from the capturing page to the video editing page during the video capturing.

8. The method of claim 1, wherein the capturing start page further comprises an indication of an image capturing mode, and wherein the method further comprises:
determining a selection of the image capturing mode;
in response to detecting an image capture instruction, controlling a capture of an image; and
entering an image editing page, the image editing page being used to edit a captured image.

9. An electronic device, comprising: at least one processing unit; and at least one memory coupled to the at least one processing unit and storing instructions to be executed by the at least one processing unit, the instructions, when executed by the at least one processing unit, causing the electronic device to perform acts comprising: in response to a capturing start instruction, presenting a capturing start page, the capturing start page comprising at least a capturing control at a first position;
in response to detecting a trigger instruction for the capturing control, switching from the capturing start page to a capturing page for video capturing, the capturing page comprising at least a stop control and a pause control, and the stop control at the first position being more highlighted than the pause control, wherein the pause control is located at a second position different from the first position;
in response to detecting a trigger instruction for the stop control, switching from the capturing page to a video editing page, the video editing page being used to edit a captured video; and in response to detecting a trigger instruction for the pause control, switching from the capturing page to a capturing pause page, the capturing pause page comprising a restart control and the stop control, and the pause control being stopped from being presented in the capturing pause page; wherein the restart control at the first position is presented highlighted than the stop control in the capturing pause page, and the stop control is located at a third position different from the first position.

10. The electronic device of claim 9, wherein the capturing control is deformed to the stop control.

11. The electronic device of claim 9, wherein the acts further comprise:
in response to detecting a trigger instruction for the pause control,
causing the video capturing to pause to obtain a first captured video segment.

12. The electronic device of claim 11, wherein the acts further comprise:
in response to detecting a trigger instruction for the restart control,
switching from the capturing pause page to the capturing page to resume video capturing, the capturing page comprising the pause control and the stop control, and the restart control being stopped from being presented in the capturing page; and
in response to detecting another trigger instruction for the pause control,
causing the video capturing to pause to obtain a second captured video segment, and
switching from the capturing page to the capturing pause page.

13. The electronic device of claim 12, wherein switching from the capturing pause page to the capturing page comprises: presenting the pause control in the capturing page highlighted more than the stop control.

14. The electronic device of claim 9, wherein the capturing start page further comprises an indication of a plurality of video capturing modes; and wherein switching from the capturing start page to the capturing page comprises:
determining a selection of a target video capturing mode of the plurality of video capturing modes; and in response to detecting the trigger instruction for the capturing control, switching from the capturing start page to a capturing page corresponding to the target video capturing mode.

15. The electronic device of claim 14, wherein the target video capturing mode has a respective upper limit of video duration, and wherein the method further comprises:
in response to detecting that a total duration of a captured video reaches the upper limit of video duration of the target video capturing mode, switching from the capturing page to the video editing page during the video capturing.

16. The electronic device of claim 9, wherein the capturing start page further comprises an indication of an image capturing mode, and wherein the method further comprises:
determining a selection of the image capturing mode;
in response to detecting an image capture instruction, controlling a capture of an image; and
entering an image editing page, the image editing page being used to edit a captured image.

17. A non-transitory computer-readable storage medium having a computer program stored thereon, the computer program, when executed by a processor, implementing acts comprising: in response to a capturing start instruction, presenting a capturing start page, the capturing start page comprising at least a capturing control at a first position;
in response to detecting a trigger instruction for the capturing control, switching from the capturing start page to a capturing page for video capturing, the capturing page comprising at least a stop control and a pause control, and the stop control at the first position being more highlighted than the pause control, wherein the pause control is located at a second position different from the first position;
in response to detecting a trigger instruction for the stop control, switching from the capturing page to a video editing page, the video editing page being used to edit a captured video; and in response to detecting a trigger instruction for the pause control, switching from the capturing page to a capturing pause page, the capturing pause page comprising a restart control and the stop control, and the pause control being stopped from being presented in the capturing pause page; wherein the restart control at the first position is presented highlighted than the stop control in the capturing pause page, and the stop control is located at a third position different from the first position.

18. The non-transitory computer-readable storage medium of claim 17, wherein the capturing control is deformed to the stop control.

19. The non-transitory computer-readable storage medium of claim 17, wherein the acts further comprise:
in response to detecting a trigger instruction for the pause control, causing the video capturing to pause to obtain a first captured video segment.

20. The non-transitory computer-readable storage medium of claim 17, wherein the acts further comprise:
in response to detecting a trigger instruction for the restart control,
switching from the capturing pause page to the capturing page to resume video capturing, the capturing page comprising the pause control and the stop control, and the restart control being stopped from being presented in the capturing page; and
in response to detecting another trigger instruction for the pause control,
causing the video capturing to pause to obtain a second captured video segment, and
switching from the capturing page to the capturing pause page.

* * * * *